US007641554B2

(12) United States Patent
Paulsen et al.

(10) Patent No.: US 7,641,554 B2
(45) Date of Patent: Jan. 5, 2010

(54) PROGRAMMABLE COMPUTER CONTROLLED EXTERNAL VISUAL INDICATOR FOR GAMING MACHINE

(75) Inventors: Craig A. Paulsen, Reno, NV (US); Paul M. Crozier, Reno, NV (US)

(73) Assignee: IGT, Reno, NV (US)

( * ) Notice: Subject to any disclaimer, the term of this patent is extended or adjusted under 35 U.S.C. 154(b) by 92 days.

(21) Appl. No.: 11/830,780

(22) Filed: Jul. 30, 2007

(65) Prior Publication Data

US 2008/0076553 A1 Mar. 27, 2008

Related U.S. Application Data

(63) Continuation of application No. 10/008,748, filed on Dec. 6, 2001, now Pat. No. 7,390,257.

(51) Int. Cl.
*G06F 17/00* (2006.01)

(52) U.S. Cl. .............................. 463/42; 463/16; 463/30

(58) Field of Classification Search ............. 463/16–22, 463/30–37, 42; 40/452, 453; 362/800; 345/39, 345/82, 84, 183

See application file for complete search history.

(56) References Cited

U.S. PATENT DOCUMENTS

| | | | |
|---|---|---|---|
| 3,796,433 | A | 3/1974 | Fraley et al. |
| 3,987,401 | A | 10/1976 | Irving |
| 4,084,194 | A | 4/1978 | Hector |
| 4,099,722 | A | 7/1978 | Rodesch et al. |
| 4,211,955 | A | 7/1980 | Ray |
| 4,247,845 | A | 1/1981 | Schmidt et al. |
| 4,363,486 | A | 12/1982 | Chaudhry et al. |
| 4,389,609 | A | 6/1983 | Kawamura |
| 4,422,775 | A | 12/1983 | Thoenig |
| 4,440,457 | A | 4/1984 | Fogelman et al. |
| 4,454,670 | A | 6/1984 | Bachmann et al. |
| 4,457,580 | A | 7/1984 | Klose |
| 4,527,798 | A | 7/1985 | Siekierski et al. |
| 4,551,717 | A | 11/1985 | Dreher |
| 4,554,419 | A | 11/1985 | King et al. |
| 4,567,481 | A | 1/1986 | Meier et al. |
| 4,662,637 | A | 5/1987 | Pfeiffer |
| 4,682,147 | A | 7/1987 | Bowman |
| 4,718,672 | A | 1/1988 | Okada |
| 4,745,543 | A | 5/1988 | Michener et al. |
| 4,760,527 | A | 7/1988 | Sidley |
| 4,792,783 | A | 12/1988 | Burgess et al. |

(Continued)

FOREIGN PATENT DOCUMENTS

AU 200066536 A1 7/2001

(Continued)

OTHER PUBLICATIONS

Office Action from U.S. Appl. No. 10/008,748, mailed Feb. 13, 2003, 8 pages.

(Continued)

*Primary Examiner*—Ronald Laneau
(74) *Attorney, Agent, or Firm*—Weaver Austin Villeneuve & Sampson LLP

(57) ABSTRACT

An improved external visual indicator such as a candle is provided for a gaming machine having lights such as LEDs which are programmable via a processor of the gaming machine. The reprogrammability of the illumination sequence and colors of the candle may provide for the promotion of bonusing and to aid in the servicing of gaming machines. Any assortment of colors of LEDs and combinations thereof may be provided and programmed via the processor of the gaming machine.

17 Claims, 4 Drawing Sheets

U.S. PATENT DOCUMENTS

| | | | |
|---|---|---|---|
| 4,818,672 | A | 4/1989 | Masukawa et al. |
| 5,024,439 | A | 6/1991 | Okada |
| 5,113,990 | A | 5/1992 | Gabrius et al. |
| 5,127,651 | A | 7/1992 | Okada |
| 5,187,377 | A | 2/1993 | Katoh |
| 5,202,549 | A | 4/1993 | Decker et al. |
| 5,224,958 | A | 7/1993 | Warunek et al. |
| 5,243,697 | A | 9/1993 | Hoeber et al. |
| 5,251,738 | A | 10/1993 | Dabrowski |
| 5,257,020 | A | 10/1993 | Morse |
| 5,321,241 | A | 6/1994 | Craine |
| 5,342,047 | A | 8/1994 | Heidel et al. |
| 5,370,399 | A | 12/1994 | Liverance |
| 5,404,406 | A | 4/1995 | Fuchigami et al. |
| 5,406,300 | A | 4/1995 | Tokimoto et al. |
| 5,477,952 | A | 12/1995 | Castellano et al. |
| 5,509,655 | A | 4/1996 | Ugawa |
| 5,510,809 | A | 4/1996 | Sakai et al. |
| 5,521,587 | A | 5/1996 | Sawabe et al. |
| 5,537,290 | A | 7/1996 | Brown et al. |
| 5,561,346 | A | 10/1996 | Byrne |
| 5,572,239 | A | 11/1996 | Jaeger |
| 5,575,459 | A | 11/1996 | Anderson |
| 5,603,659 | A | 2/1997 | Okada |
| 5,605,506 | A | 2/1997 | Hoorn et al. |
| 5,611,730 | A | 3/1997 | Weiss |
| 5,630,081 | A | 5/1997 | Rybicki et al. |
| 5,657,221 | A | 8/1997 | Warman et al. |
| 5,670,971 | A | 9/1997 | Tokimoto et al. |
| 5,687,331 | A | 11/1997 | Volk et al. |
| 5,694,562 | A | 12/1997 | Fisher |
| 5,712,661 | A | 1/1998 | Jaeger |
| 5,720,662 | A | 2/1998 | Holmes, Jr. et al. |
| 5,739,809 | A | 4/1998 | McLaughlin et al. |
| 5,748,157 | A | 5/1998 | Eason |
| 5,765,797 | A | 6/1998 | Greene et al. |
| 5,774,115 | A | 6/1998 | Jaeger et al. |
| 5,786,811 | A | 7/1998 | Jaeger |
| 5,805,145 | A | 9/1998 | Jaeger |
| 5,805,146 | A | 9/1998 | Jaeger et al. |
| 5,813,914 | A | 9/1998 | McKay et al. |
| 5,818,361 | A | 10/1998 | Acevedo |
| 5,826,882 | A | 10/1998 | Ward |
| 5,834,889 | A | 11/1998 | Ge |
| 5,836,819 | A | 11/1998 | Ugawa |
| 5,841,428 | A | 11/1998 | Jaeger et al. |
| 5,850,126 | A | 12/1998 | Kanbar |
| 5,867,149 | A | 2/1999 | Jaeger |
| 5,876,285 | A | 3/1999 | Salour et al. |
| 5,882,261 | A | 3/1999 | Adams |
| 5,908,354 | A | 6/1999 | Okuniewicz |
| 5,914,676 | A | 6/1999 | Akpa |
| 5,936,599 | A | 8/1999 | Reymond |
| 5,936,613 | A | 8/1999 | Jaeger et al. |
| 5,956,876 | A | 9/1999 | Burdette et al. |
| 5,966,125 | A | 10/1999 | Johnson |
| 5,971,850 | A | 10/1999 | Liverance |
| 5,977,955 | A | 11/1999 | Jaeger |
| 6,068,101 | A | 5/2000 | Dickenson et al. |
| 6,071,190 | A | 6/2000 | Weiss et al. |
| 6,102,394 | A | 8/2000 | Wurz et al. |
| 6,106,393 | A | 8/2000 | Sunaga et al. |
| 6,110,041 | A | 8/2000 | Walker et al. |
| 6,117,010 | A | 9/2000 | Canterbury et al. |
| 6,126,542 | A | 10/2000 | Fier |
| 6,134,103 | A | 10/2000 | Ghanma |
| 6,135,884 | A | 10/2000 | Hedrick et al. |
| 6,146,273 | A | 11/2000 | Olsen |
| 6,146,274 | A | 11/2000 | Salour et al. |
| 6,164,645 | A | 12/2000 | Weiss |
| 6,165,069 | A | 12/2000 | Sines et al. |
| 6,201,352 | B1 | 3/2001 | Ge et al. |
| 6,201,703 | B1 | 3/2001 | Yamada et al. |
| 6,213,875 | B1 | 4/2001 | Suzuki |
| 6,227,970 | B1 | 5/2001 | Shimizu et al. |
| 6,239,716 | B1 | 5/2001 | Pross et al. |
| 6,241,362 | B1 | 6/2001 | Morrison |
| 6,244,958 | B1 | 6/2001 | Acres |
| 6,265,984 | B1 | 7/2001 | Molinaroli |
| 6,270,404 | B2 | 8/2001 | Sines et al. |
| 6,275,217 | B1 | 8/2001 | Jaeger |
| 6,278,419 | B1 | 8/2001 | Malkin |
| 6,302,790 | B1 | 10/2001 | Brossard |
| 6,305,602 | B1 | 10/2001 | Grabowski et al. |
| 6,305,821 | B1 | 10/2001 | Hsieh et al. |
| 6,315,663 | B1 | 11/2001 | Sakamoto |
| 6,315,666 | B1 | 11/2001 | Mastera et al. |
| 6,319,125 | B1 | 11/2001 | Acres |
| 6,342,901 | B1 | 1/2002 | Adler et al. |
| 6,350,199 | B1 | 2/2002 | Williams et al. |
| 6,364,314 | B1 | 4/2002 | Canterbury |
| 6,364,769 | B1 | 4/2002 | Weiss et al. |
| 6,368,216 | B1 | 4/2002 | Hedrick et al. |
| 6,371,636 | B1 | 4/2002 | Wesson |
| 6,398,217 | B1 | 6/2002 | Shimizu et al. |
| 6,435,970 | B1 | 8/2002 | Baerlocher et al. |
| 6,454,649 | B1 | 9/2002 | Mattice et al. |
| 6,475,087 | B1 | 11/2002 | Cole |
| 6,491,298 | B1 | 12/2002 | Criss-Puszkiewicz et al. |
| 6,520,308 | B1 | 2/2003 | Martin et al. |
| 6,565,434 | B1 | 5/2003 | Acres |
| 6,575,090 | B1 | 6/2003 | Vienneau et al. |
| 6,609,969 | B1 | 8/2003 | Luciano et al. |
| 6,609,970 | B1 | 8/2003 | Luciano, Jr. |
| 6,641,484 | B2 | 11/2003 | Oles et al. |
| 6,645,077 | B2 | 11/2003 | Rowe |
| 6,646,695 | B1 | 11/2003 | Gauselmann |
| 6,688,984 | B2 | 2/2004 | Cole |
| 6,700,567 | B1 | 3/2004 | Jaeger et al. |
| 6,769,982 | B1 | 8/2004 | Brosnan |
| 6,798,359 | B1 | 9/2004 | Ivancic |
| 6,835,133 | B2 | 12/2004 | Baerlocher et al. |
| 6,843,720 | B2 | 1/2005 | Luciano et al. |
| 6,897,624 | B2 | 5/2005 | Lys et al. |
| 6,908,387 | B2 | 6/2005 | Hedrick et al. |
| 6,984,174 | B2 | 1/2006 | Cannon et al. |
| 7,014,563 | B2 | 3/2006 | Stephan et al. |
| 7,113,175 | B2 | 9/2006 | Liu et al. |
| 2002/0050983 | A1 | 5/2002 | Liu et al. |
| 2002/0141643 | A1 | 10/2002 | Jaeger |
| 2002/0142846 | A1 | 10/2002 | Paulsen |
| 2002/0183106 | A1 | 12/2002 | Cole |
| 2003/0027631 | A1 | 2/2003 | Hedrick et al. |
| 2003/0054881 | A1 | 3/2003 | Hedrick et al. |
| 2003/0064814 | A1 | 4/2003 | Stephan et al. |
| 2003/0100357 | A1 | 5/2003 | Walker et al. |
| 2005/0037843 | A1 | 2/2005 | Wells et al. |
| 2005/0111217 | A1 | 5/2005 | Feng |
| 2007/0020572 | A1 | 1/2007 | Furner et al. |

FOREIGN PATENT DOCUMENTS

| | | | |
|---|---|---|---|
| AU | 200179450 | A1 | 4/2002 |
| AU | 200169967 | B2 | 3/2003 |
| EP | 0 274 879 | A2 | 7/1988 |
| EP | 0 896 305 | A2 | 10/1999 |
| EP | 0 896 308 | A1 | 10/1999 |
| EP | 1544025 | A2 | 6/2005 |
| EP | 1686549 | A1 | 8/2006 |
| WO | WO 94/24683 | | 10/1994 |
| WO | WO01/082657 | | 11/2001 |
| WO | WO 2007/032949 | A1 | 3/2007 |

OTHER PUBLICATIONS

Final Office Action from U.S. Appl. No. 10/008,748, mailed May 29, 2003, 9 pages.
Office Action from U.S. Appl. No. 10/008,748, mailed Aug. 18, 2003, 9 pages.
Final Office Action from U.S. Appl. No. 10/008,748, mailed Apr. 1, 2004, 10 pages.
Office Action from U.S. Appl. No. 10/008,748, mailed Aug. 3, 2004, 8 pages.
Final Office Action from U.S. Appl. No. 10/008,748, mailed Jun. 8, 2005, 6 pages.
Office Action from U.S. Appl. No. 10/008,748, mailed Dec. 7, 2005, 5 pages.
Final Office Action from U.S. Appl. No. 10/008,748, mailed Jul. 10, 2007, 7 pages.
Office Action from U.S. Appl. 10/435,298, mailed Jun. 8, 2005, 6 pages.
Final Office Action from U.S. Appl. No. 10/435,298, mailed Jul. 11, 2006, 11 pages.
Final Office Action from U.S. Appl. No. 10/435,298, mailed Jan. 11, 2007, 10 pages.
Notice of Allowance from U.S. Appl. No. 10/435,298, mailed Sep. 21, 2007, 6 pages.
Office Action from Australian Patent Application No. 2002346635, dated Nov. 16, 2007, 2 pages.
International Search Report from International Patent Application No. PCT/US02/38663, mailed Feb. 26, 2003, 2 pages.
Office Action (Advisory Action) from U.S. Appl. No. 10/008,748, mailed Apr. 5, 2007, 3 pages.
Notice of Allowance from U.S. Appl. No. 10/008,748, mailed Mar. 17, 2008, 7 pages.
Office Action (Advisory Action) from U.S. Appl. No. 10/435,298, mailed Oct. 5, 2006, 3 pages.
Office Action (Advisory Action) from U.S. Appl. No. 10/435,298, mailed Apr. 24, 2007, 5 pages.
Notice of Allowance from U.S. Appl. No. 10/435,298, mailed Mar. 18, 2008, 8 pages.
Notice of Allowance from U.S. Appl. No. 10/435,298, mailed Jul. 22, 2008, 5 pages.
Second Office Action from Australian Patent Application No. 2002346635, dated Feb. 22, 2008, and mailed Mar. 26, 2008, 4 pages.
PCT Search Report and Written Opinion dated Sep. 15, 2008 issued in PCT/US2007/023509.
US Office Action dated Jan. 29, 2009 issued in U.S. Appl. No. 11/595,803.
Statement of Grounds and Particulars dated May 25, 2009 issued in Australian Application No. 2002346635.

PROGRAMMABLE COMPUTER CONTROLLED EXTERNAL VISUAL INDICATOR FOR GAMING MACHINE

CROSS REFERENCE TO RELATED APPLICATIONS

This application is a continuation of and claims priority to U.S. patent application Ser. No. 10/008,748 entitled "PROGRAMMABLE COMPUTER CONTROLLED EXTERNAL VISUAL INDICATOR FOR GAMING MACHINE", filed on Dec. 6, 2001, now U.S. Pat. No. 7,390,257 which is incorporated by reference herein for all purposes.

FIELD OF INVENTION

The present invention relates generally to gaming machines and in particular to external visual indicators for such gaming machines. In a particular embodiment the invention pertains to the programming of tower lamps or candles mounted to the top of a slot machine.

BACKGROUND OF THE INVENTION

Gaming machines such as slot machines generally have an external visual indicator such as a multi-colored electronic light, tower lamp or "candle" provided thereon. Such candles provide a visual indicator that may be viewed from many yards away from the machine that identify certain occurrences or servicing needs of that particular gaming machine. For example, the need to fill a coin hopper in a gaming machine may be indicated with a yellow light that indicates that additional quarters are needed. A red light in certain circumstances may indicate that a jack-pot has been won. Other colors may be indicative of the need for servicing of the machine. Generally, gaming machines have candles having one to four stages that are colored either red, yellow, blue or green. Such candles generally have an incandescent light bulb surrounded by a clear or translucent cylindrical shell. Inserted within the shell is generally a colored mylar insert or colored plastic film. Each stage of the candle has a different colored film in order to provide the transmission of each particular color at each stage. Such arrangements have the disadvantage in that if the colors of the candle ever need to be changed it may be a difficult and time consuming operation. Generally, a casino service technician will have to climb to the top of the gaming machine, dismantle the candle, remove any of the colored films within the candle that are undesirable and insert new colored films at the desired stages of the candle. Such changes of the colors of machines may be frequent. For example, if a machine is changed from a quarter machine to a dollar machine it is necessary to change the colors of the candle.

Further, the presently known candles that are not programmable require that each type of gaming machine have a custom manufactured candle. Each machine may have a different orientation of stages and colors of the candle that must be individually manufactured and assembled. Therefore that manufacturer cannot keep in stock hundreds of uniform candles to be used on any machine which increases production costs and may cause delays in production of the entire gaming machine. The present invention introduces a programmable candle that could reduce manufacturing costs since one candle could be manufactured that may be programmed by the end purchaser of the gaming machine to suit the desired purpose.

In addition, a prior art system of candles having colored film inserts has very limited uses for providing other information. It is desirable to have a visual indication means on a gaming machine that can provide a multitude of information and be altered quickly and easily. A prior art system By provides for a maximum of four colors in a static orientation. The ability to reprogram the colors of the lights and their orientation or sequence of transmission or flashing would provide a visual indicator that would multiply by thousands the potential signals or information that a gaming machine may transmit visually. By having multiple lighting effects and sequences, casinos using such gaming machines could use the candles in many new and different ways to create marketing and promotional opportunities and create more excitement in the area where such gaming machine(s) are located. It should be recognized that the visual indicator of the present invention may be used with any conventional gaming machine. Exemplary manufacturers of such gaming machines include International Game Technology, of Reno, Nev. and Bally Gaming, Inc. of Las Vegas, Nev. Candles provided on gaming machines of such vendors typically include two light sources, although some candles may have 1, 3, or 4 light sources. Each such light source is located in a different vertical position and has a different associated color band. This allows the gaming machine to display messages coded by different colors. Therefore, there is desired a gaming machine having a programmable computer operated visual indicator. The present invention provides such a device.

SUMMARY OF THE INVENTION

In accordance with one embodiment of the present invention, a gaming machine comprises a user input panel, a processor connected to the input panel and adapted to be programmed in response to an input operation by a user, an external visual indicator mounted to the gaming machine and providing illumination of at least two colors and a processor providing for the control of the color display of the external visual indicator.

In an illustrative embodiment, the gaming machine may also comprise the external visual indicator having a cylindrically-shaped electronic candle mounted on a top surface of the gaming machine. The gaming machine comprises the external visual indicator including multiple LEDs big connected to the processor. The gaming machine may further comprise a pulse width modulator (PWM) connected to the processor and a current driver connected to the PWM and connected to the LEDs. The gaming machine may further comprise an external visual indicator having at least two stages and each stage having at least three LEDs mounted therein. The gaming machine may further comprise the processor providing for the ability to provide a strobing effect of the LEDs. The gaming machine may further comprise the LEDs providing for the colors red, green, blue, orange, yellow, and/or white. The gaming machine may further comprise the processor having the ability to produce colors other than the primary colors by mixing the colors of the LEDs. The gaming machine may further comprise LEDs that are comprised of three colors: red, green and blue in one package. Such LED's can emit any color. The gaming machine may further comprise an I/O (input/ouput) interface connected to the processor. The gaming machine may further comprise a coding and buffer system connected to the I/O interface. The gaming machine may further comprise a DC power supply connected to the current driver. The gaming machine wherein a user may access user input panel and choose a combination of lights and colors to be displayed so that an electrical signal is sent to the processor which signals the I/O interface, which signals the coding and buffer system which signals the PWM in order to control the current driver, in order to control the LEDs according to the combination chosen by the user. The gaming machine wherein the processor may include all other components and functions in order to operate the gaming machine and provides for the main processor. The gaming machine wherein the PWM maybe connected to the main processor via a secondary stand-alone board. In another illustrative embodiment, the processor may be a secondary processor which is separate from the main processor that operates the primary functions of the gaming machine.

In one embodiment of the present invention, a method is provided of promoting the use of gaming machines via the use of computer-programmed external visual indicators, the method comprising the steps of providing a gaming machine having a programmable external visual indicator connected to a processor of the gaming machine, coordinating the external visual indicator with a first special event of the gaming machine, programming the processor so that a first customized illumination pattern is provided by the external visual indicator in order to designate the first special event and automatically triggering the first customized illumination pattern of the external visual indicator upon the occurrence of the first special event. The method may further comprise the external visual indicator being a cylindrically-shaped or other shape electronic candle. The method may further comprise the first special event being a bonus round. The method may further comprise the first special event being a jackpot. The method may further comprise the first special event being a requirement to service the gaming machine. The method wherein the first customized illumination pattern may include a strobing effect. The method wherein the first customized illumination pattern may include a combination of lights to provide a yellow illumination. The method wherein the first customized illumination pattern may include the combination of lights to provide a purple illumination. The method wherein the first customized illumination pattern may include a combination of lights to provide a green illumination. The method wherein the first customized illumination pattern may include a combination of lights to provide an orange illumination. The method wherein the first customized illumination pattern may include a combination of lights to provide an indigo illumination. The method wherein the first customized illumination pattern may include a combination of lights to provide a violet illumination. The method wherein the first customized illumination may include a combination of lights to provide a first stage of a candle having a first color and a second stage of the candle having a second color. The method wherein the first customized illumination pattern may include a combination of lights to provide a first stage of a candle having a first color, a second stage of the candle having a second color and a third stage of the candle having a third color. The method wherein the first customized illumination pattern may include a combination of lights to provide a first stage of a candle having a first color, a second stage of the candle having a second color, a third stage of the candle having a third color and a fourth stage of the candle having a fourth color.

In an embodiment the method may further comprise the steps of programming the processors so that a second customized illumination pattern is provided. The method may further comprise the steps of programming the processor so that a second special event triggers the second customized illumination pattern. The method wherein the programmable external visual indicator may comprise multiple LEDs mounted within a cylindrically-shaped or other shape electronic candle. The method wherein the programmable external visual indicator may comprise a cylindrically-shaped electronic candle having at least two stages and each stage having LEDs mounted therein consisting of a group of LED's containing individual red, green or blue LED's.

In one embodiment, the method wherein the step of programming the processor may further include the steps of providing a user input panel, choosing the combination of lights and colors to be displayed, sending an electrical signal to the processor, signaling an I/O interface, signaling the coding and buffering system, signaling a pulse with modulator in order to control a current driver in order to control the LEDs according to the combination chosen by the user. The method wherein the steps of automatically triggering the first customized illumination pattern may occur via sending an electrical signal to the processor, signaling an I/O interface, signaling a coding and buffer system, signaling a pulse width modulator in order to control the current driver, in order to control the LEDs according to the combination chosen by the user.

Another embodiment of the present invention may provide for an improved cylindrical or other shape electronic candle mounted on a gaming machine comprising a gaming machine having a signal processor connected to a pulse with modulator, connected to a current driver that is connected to multiple LEDs mounted in the candle, a user input panel provided by the gaming machine connected to the processor by which a first illumination pattern may be selected and by which the user may indicate a first special event that will trigger the first illumination pattern. The gaming machine wherein the set-up menu provides for a second illumination pattern and a second special event. The gaming machine wherein the candle includes three stages having multiple LEDs per stage.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE PRESENTLY PREFERRED EMBODIMENTS

Figure 1:
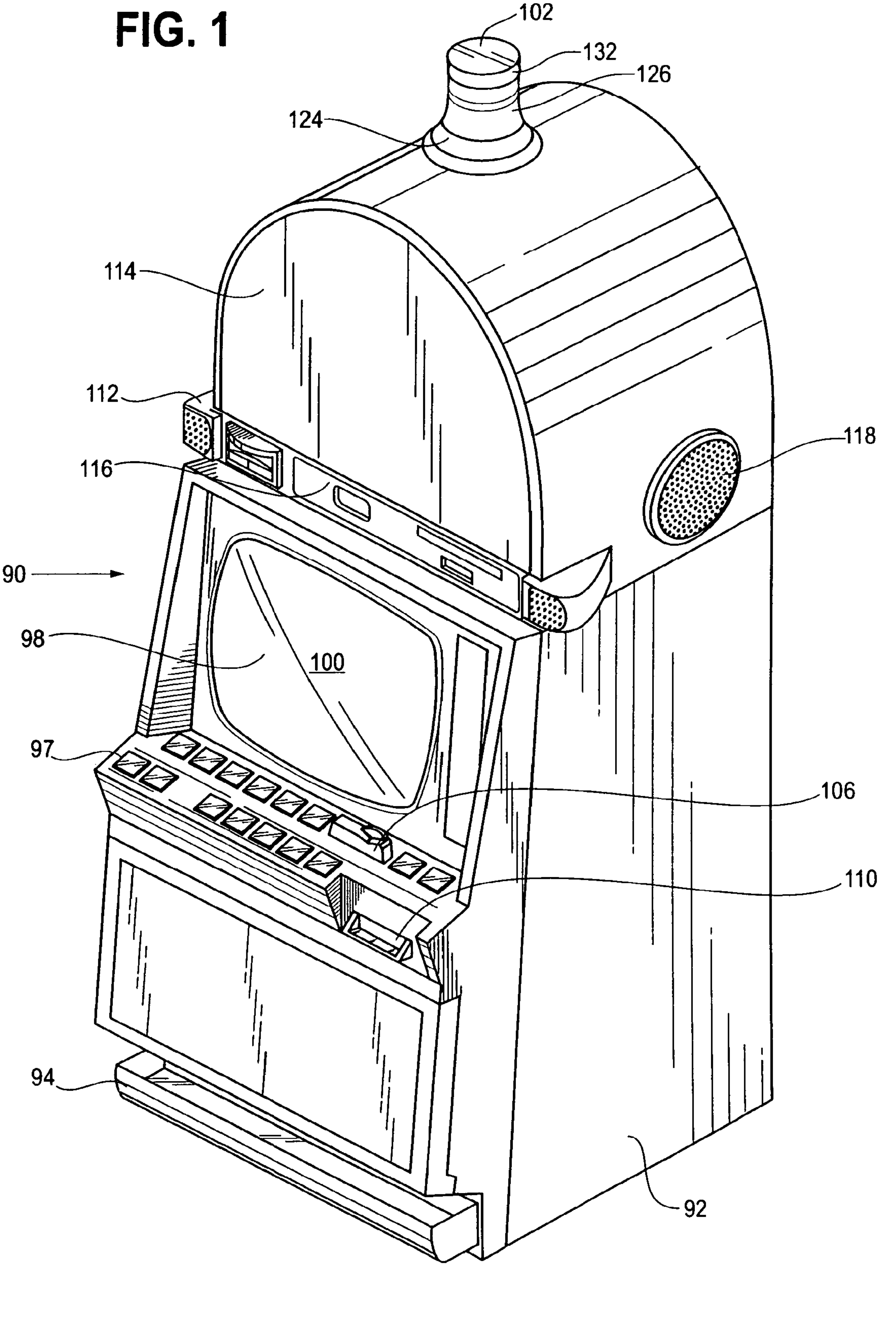
FIG. 1 is a perspective view of a standard gaming machine having the external visual indicator of the present invention mounted thereon.

The present invention is described in view of FIGS. 1-6 wherein like numerals designate like elements in the figures. In FIG. 1 a first embodiment of a gaming machine 90 is shown and includes a machine chassis 92, various game play option buttons 97, touch pad or user input panel 98, and a video monitor display 100. It is important to note the external visual indicator or candle 102 is located on top of the gaming machine chassis 92 in the same location and orientation as a conventional candle. Further, the candle may have the same external appearance as a cylindrically-shaped conventional candle. However, unlike a conventional candle, the candle 102 includes an a light emitting means that may be quickly and easily reprogrammed. Although a candle 102 is shown that has one stage, the present invention may operate with a candle having any number of stages from 1 to 10. In addition, in other embodiments the candle may be square, pyramidal or any other shape. In an embodiment the gaming machine includes dollar bill acceptor 110, speaker assembly 112, illuminated panel 114, player tracking panel 116 and speaker 118.

To play the gaming machine 90, a player inserts coins or tokens through a slot 106, activates the machine by in some cases pushing buttons 97 or touching on the panel 98, or taking some other action. The player then observes the indicators on display 100 to determine if he or she has obtained a winning combination. If so, the display 100 may indicate the amount won. Simultaneously, any winnings will be dropped into a tray 94. At various stages during this procedure, the candle 102 may be active. For example, if a player does win, a coin hopper in the gaming machine 90 may have to be refilled. In this case, a candle light of a particular color will be illuminated. This is an example of a traditional use of a candle 102, which use continues to be programmable via the present invention. The candle 120 includes a base 124 adapted to be mounted on the gaming machine chassis 92. The base 124 is also adapted to receive a cylindrical sleeve 126. In prior art devices this cylindrical sleeve would have been tinted or treated with a film in order to transmit light of a particular color from a first light source disposed within a lower region of candle such as an incandescent bulb. In the present invention the sleeve 126 may be translucent or transparent. A divider ring may separate a lower cylindrical sleeve, or first stage, from an upper cylindrical sleeve or second stage. A cap 132 is provided on top of upper most cylindrical sleeve 126. The cap may be held in place on top of candle by a nut or other fastener which is screwed onto a threaded vertical rod (not shown) which spans the interior of candle 120. Located inside the candle, spaced as desired, are a light source or multiple light sources. In an embodiment, LEDs may be used to provide illumination. However, other light sources that emit colored light such as colored incandescent bulbs, neon lights, etc. may be used. In an embodiment the LEDs may be oriented at each stage where at least one LED of each desired color is located at each stage, as will be described in more detail below with regard to FIG. 3. Single LEDs that emit multiple colors may be used as well.

Figure 2:
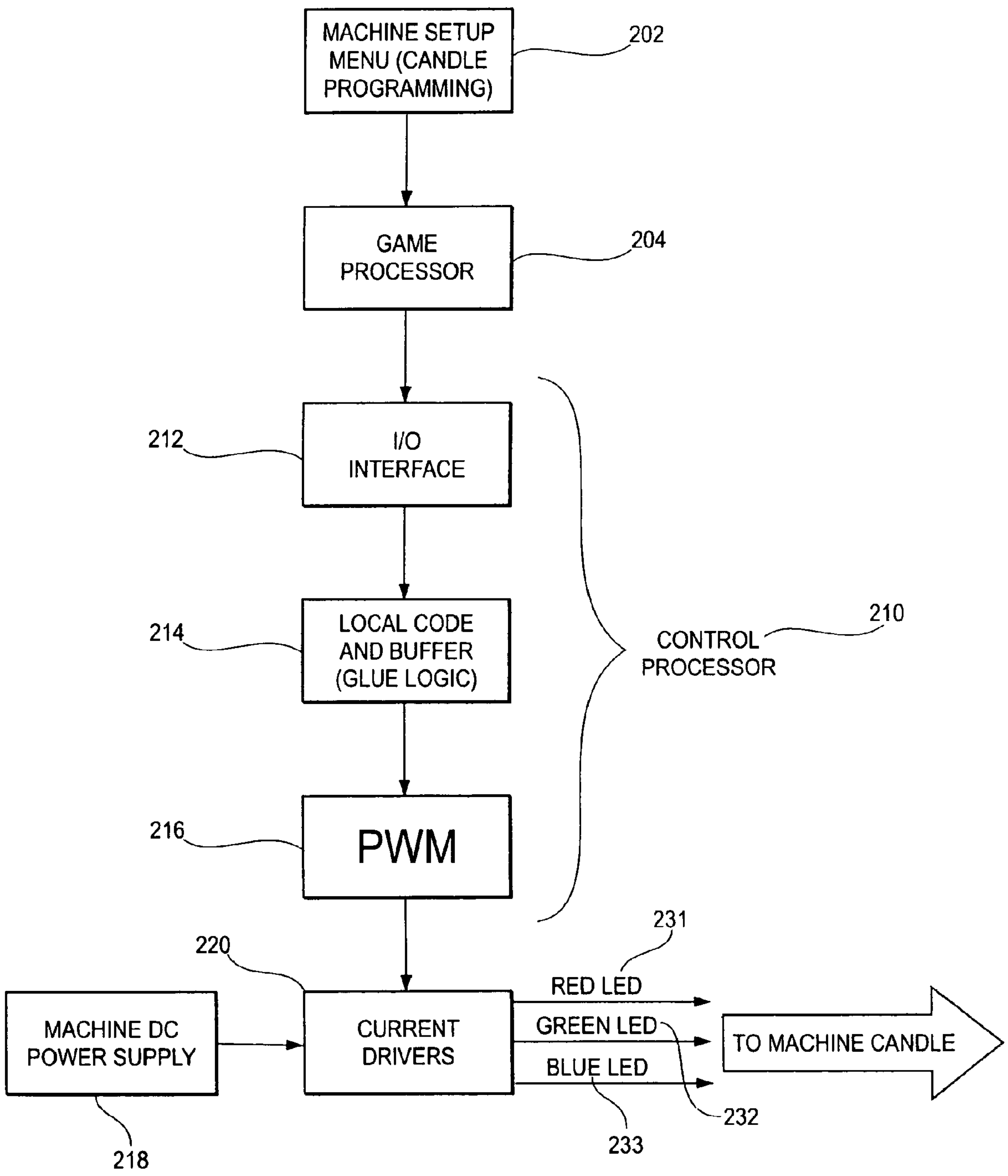
FIG. 2 is a flow diagram of the operation of the present invention.

FIG. 2 discloses a flow diagram indicating the preferred operation of the present invention. A machine set-up menu 202 is provided which allows for the programming of the candle 102. The set-up menu 202 is accessible through the touchpad screen or user input panel 98 on the monitor 100 of the gaming machine 92. For example, if the access to the candle set-up menu is to be accessed only by personnel of the gaming facility, or casino, a security code may be required to be input through the touch screen 98 in order to access such a setup mode. Existing player or user, interface switches 97 on the games front panel may be assigned temporary special functions during a special "setup mode" where illumination patterns may be selected or programmed by the user. In the case of video games, these controls may be in the form of buttons on a "touchscreen" 98. A window or set-up menu may appear on the panel or through touchscreen 98 on the monitor 100 or toggling player switches 97 and viewing results in an external display displaying certain options available in order to set-up and program the candle 102. Certain headings could be provided on the panel display 98 such as Colors, Illumination Intensity, Orientation, Strobing Effect, Coordination with Special Events, etc. Upon touching one of the headings on the panel 98 a scroll-down menu may appear giving further choices in order to program the candle. This touch-pad or panel 98 can also be used to program the other main functions or operation of the gaming machine, as is known to one of ordinary skill in the art. The touch screen and the graphics displayed on the user input panel 98, including the set-up menu, are controlled by software which is controlled by the game processor 204. In a preferred embodiment, the game processor which controls all the functions of the gaming machine also controls the candle and the programming thereof. An alternate embodiment is discussed below where a separate processor may be provided in order to provide solely for the programming of the candle.

The game processor 204 is connected to a control processor 210. The control processor in an embodiment comprises of an I/O (input/output) interface 212 connected to local coding and buffer (Glue Logic) 214 which is connected to a pulse width modulator (PWM) 216. In an embodiment, instead of the use of a PWM, a digital-to-analog converter may be used. These three elements comprise the Control Processor 210, which is electrically connected to a current driver 220. The current driver is connected to a DC power supply 218. In an embodiment a 25 volt power supply may be provided. This, in a preferred embodiment, is included in the power supply 218 that provides power for the entire gaming machine. However, in an alternate embodiment, a separate power supply may be provided solely for the current driver 220 for the candle 102. Running from the current driver are electrical wires that connect to the external visual indicator elements of the candle 102. In a preferred embodiment these external visual indicators will be LEDs. FIG. 2 shows the current driver connected to three LEDs. A first LED 231 which is red, a second LED 232 which is green and a third LED 233, which is blue. These LEDs 231, 232, 233 are mounted within the machine candle. However, the current driver may be connected to any number of LEDs from one to 1,000. The principal limitation of the number of LEDs is the current capacity of the current driver 220 and the power supply 218.

The programming of the candle may occur as follows:

A user opens the setup menu 202 via the user input panel 98 and indicates the color and sequence and combination of lighting that is desired. This information is received by the game processor 204, which stores that information. Along with the stored information is the triggering event such as a certain occurrence of the gaming machine or as directed by a networked system application. For example, a bonus round or a jackpot. Upon the occurrence of the triggering event, the game processor 204 will signal the I/O interface 212, which will then signal the local coding and buffer system 214 which will then provide an electronic signal to the pulse width modulator, which will then signal the current driver 220, which will then provide the electrical signal to the required number of LEDs in the proper sequence. In some embodiment, a USB protocol may be used in order to program the I/O interface 212. It is apparent that the present invention provides for the programming of the candle but also the reprogramming of the candle and replacement of one set of illumination selection instructions with another set of illumination selection instructions.

Figure 3:
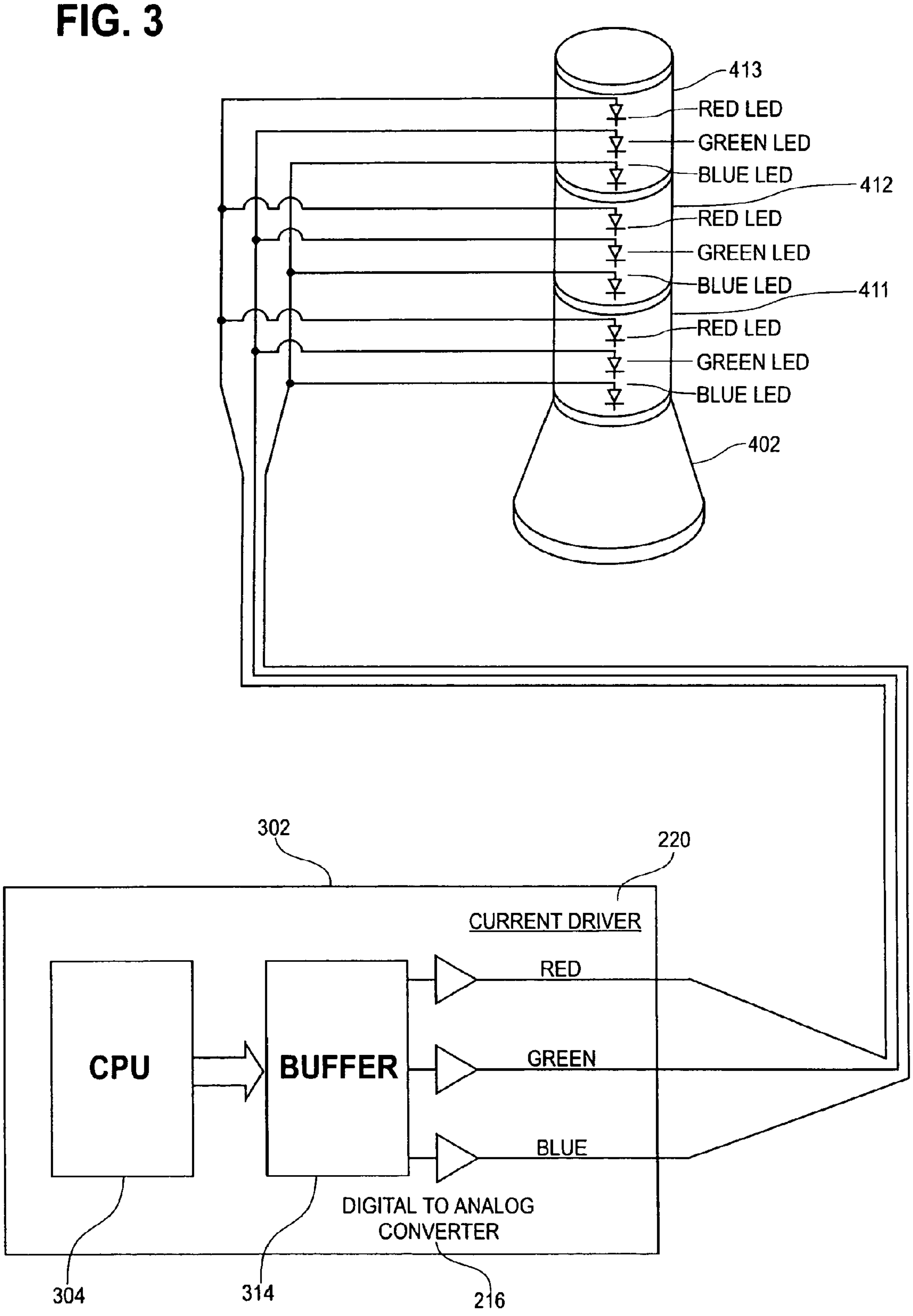
FIG. 3 is an alternate embodiment showing an electronic flow diagram and its diagrammatic connection to a external visual indicator.

Turning to FIG. 3. is an alternate embodiment of the present invention as shown. An add-on board 302 may be added to the existing processor board which was under the I/O interface control 212. This stand-alone board 302 functions separate or apart from the main circuit board of the gaming machine having a main processor such as processor 204 shown in FIG. 2. In certain circumstances, it may be preferable to have an add-on board 302 in order to upgrade a gaming machine which does not have a reprogrammable candle 102. In such an instance, it is more efficient to provide an add-on board 302 than to remove the main printed circuit board and processor in order to put an entirely new board in the gaming machine. The add-on board 302 includes its own central processor unit 304 which is connected to a buffer 314 which includes an interface and is connected to a digital-to-analog converter 216. In an embodiment, instead of a digital analog converter 218, a PWM may be provided. These are then connected through a current driver 220 which is then connected to the external visual indicators.

In the embodiments shown in FIG. 3, LEDs are used as the external visual indicators. In the embodiment shown, LEDs with arrays of red, green, blue are disclosed. However, as discussed previously, additional quantities and types LEDs may be provided. In fact, the add-on board 302 is shown connected to candle 402 which includes a first stage 411, a second stage 412 and a third stage 413. The stages of the candle may be constructed similar to that described previously as the candle disclosed in FIG. 1. However, one additional stage 413 is provided. In this embodiment of the invention, 3 LEDs are shown displayed in each stage. (The diagram in FIG. 3 is merely diagrammatic in that the electrical connections going to each of the three stages is merely representative and the actual connections, as would be known to one of ordinary skill in the art, would be through electrical cables running through the bottom of the candle 402 up inside the cylindrical or other shape shell of the candle and connecting to printed circuit boards therein with the LEDs mounted thereon.) The diagrammatic illustration in FIG. 3 indicates that stage one 411 will have a red, green and blue LED or other types and configurations and likewise for stage two 412 and stage three 413. The orientation of the LEDs shown in FIG. 3 in the vertical arrangement is also only diagrammatic. The orientation of the actual LEDs within the candle 402 may be arranged according to the manufacturer's preference in order to provide for the best illumination effect. For example, all the LEDs at each stage may be mounted in one horizontal level or they may be placed adjacent the external circumference of the outer cylinder walls in order to provide a brighter illumination of the LEDs.

Based on the previous discussions of the programming of the candle via the processor. It should be understood that the LEDs may be lit in any orientation according to any sequence triggered by any special event of the gaming machine. For example, all of the green LEDs in stage one 411, two 412 and three 413 may be lit upon the occurrence of a bonus round. In a further round of the game, all of the blue LEDs in stage one 411, two 412 and three 413 may be lit to identify a second bonus round. Finally, if it is so desired, if a third bonus is reached all of the red LEDs in stage 1, 2 and 3 may be lit.

Further, the LEDs may be lit in order to provide other colors. The lighting of the blue and red LED in stage one 411 may provide for a purple color to be illuminated therein. This may be done simultaneously with the lighting of the blue and green LEDs in stage two 412 which may provide a yellow color to be illuminated. Finally, the red and blue LED in stage three 413 may be illuminated in order to provide an indigo colored illumination. In fact, by use of LED's with red, blue and green any color may be produced and a tri-color red, blue or green LED in one stage provides 360.degree. of uniform color. Further, it may be understood that the LEDs may be turned on and off in rapid succession in order to provide certain special effects. For example, a strobing effect of the lights having certain colors may be provided. In another presentation of the lights, a visual effect of a ring of lights may be provided which moves up and down the candle 102 according to the programming of the processor by sequentially illuminating the LEDs. To provide such an effect, additional LEDs may be needed wherein multiple LEDs at each stage are required. In another embodiment, multi-colored LEDs may be provided in order to provide the maximum illumination effect.

Figure 4:
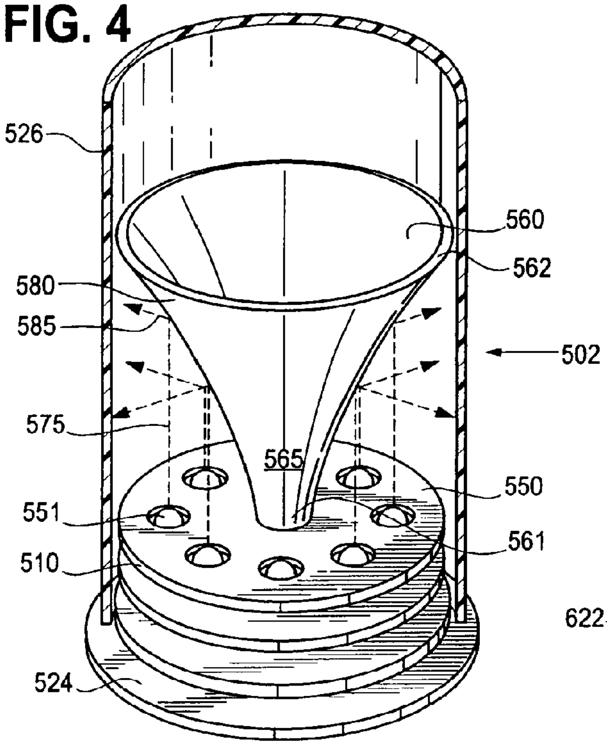
FIG. 4 is an embodiment of the internal construction of a candle of the present invention.
Figure 5:
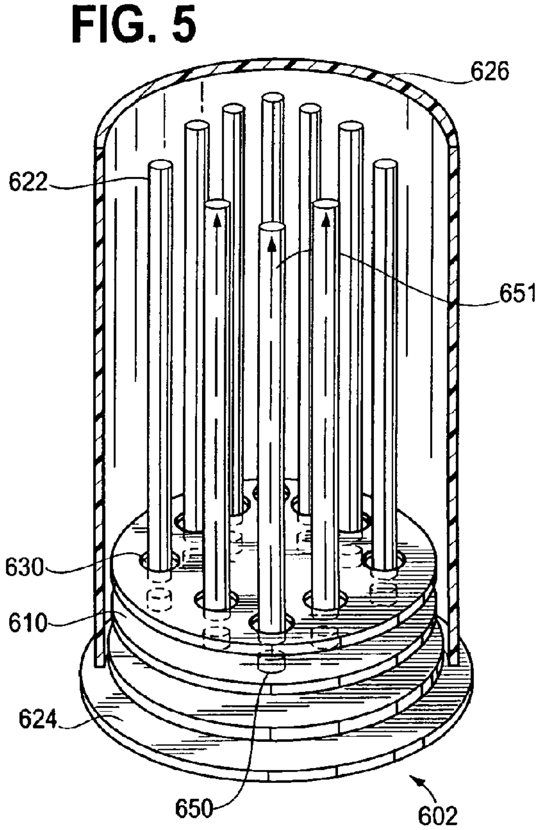
FIG. 5 is another embodiment of the internal construction of a candle of the present invention.
Figure 6:
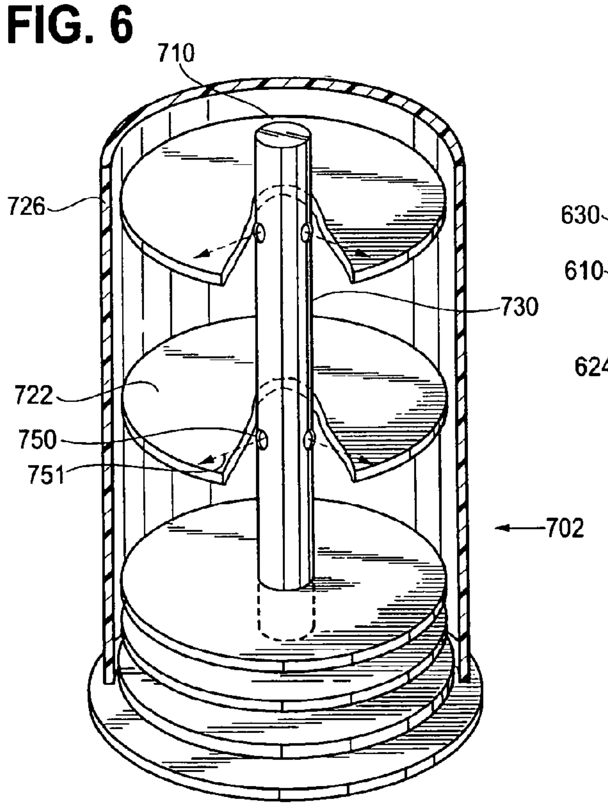
FIG. 6 is a further embodiment of the internal construction of a candle of the present invention.

FIGS. 4-6 disclose embodiments of the internal construction of a candle of the present invention. For example, FIG. 4 discloses candle 502 formed by candle sleeve or tube 526. The candle tube 526 in an embodiment may formed of clear plastic or glass. Located at the base 524 of the candle is a circular shaped printed circuit board (PCB) 510 having LEDs 550 mounted thereon. The LEDs 550 are oriented around the diameter of the PCB forming a circular pattern of LEDs 550. The LEDs may be of any color such as alternating red, green and blue. Mounted at the center of the PCB 510 and projected upwardly is a conical parabolic reflector 560. The conical parabolic reflector 560 has a highly polished or mirrored surface 565. The conical parabolic reflector 560 has a first end 561 mounted to the PCB 510 and a second end 562 adjacent a cap of the candle (not shown). The diameter of the conical parabolic reflector 560 increases from the first end 561 to the second end 562. The second end 562 has a diameter slightly less than the diameter of the candle tube 526.

As shown in FIG. 4 the light from the LEDs is transmitted upward and perpendicular to the plane of the PCB 510 and parallel to the sides of the candle tube 526. For example, the light from LED 551 follows the direction of arrow 575 until it hits the surface 565 of the conical parabolic reflector 560 at point 580. The mirrored surface 565 causes the light from the LED to reflected at an angle towards the sides of the candle tube 526 along the direction of arrow 585 and transmit through the translucent candle tube 526. The light from the LED 551 is reflected at approximately a 90 degree angle. The location of the LEDs 550 maybe oriented in a predetermined location on the PCB 510 in order to effect the angle at which the light will be reflected. LEDs located closer to the center of the PCB 510 and the first end 561 of the conical parabolic reflector 560 will strike the curved surface of the conical parabolic reflector 560 sooner and at a smaller angle. LEDs mounted farther from the center of the PCB 510 will travel further before striking the conical parabolic reflector 560 and will be reflected closer to the second end 562 at a larger angle. The overall effect of multiple multi-colored LEDs being reflected by the conical parabolic reflector 560 will be a rainbow effect for the human eye observing the rays of light emitted from the candle 502. As discussed previously, the color of light and frequency at which the light rays are transmitted can be controlled by the computer in order to greatly vary the illumination pattern.

FIG. 5 discloses another embodiment of the internal construction of a candle 602 having a candle tube 626. Mounted at the base 624 of the candle 602 is a PCB 610 having a plurality of LEDs 650 mounted thereon. Mounted above the PCB 610 is a support plate 615. In a preferred embodiment the support plate 615 and the PCB 610 have an equal diameter that is approximately equal to the inside diameter of the candle tube 626. Mounted to the support plate in an embodiment are a plurality of clear or translucent or transparent acrylic rods 622 which protrude through holes 630 in the support plate 615 so that the ends of the rods 622 are exposed. The each rod 622 is oriented to a corresponding LED 650 on the PCB 610 so that the majority of the light transmitted from each LED 650 is received in the end of the corresponding rod 622 so that little coupling loss occurs. In an embodiment the end of each rod 622 that is adjacent the PCB 610 is polished to allow for the maximum transmission of light. Each rod therefore acts as a waveguide in order to transmit the light from the LEDs along the length of the candle 602 in direction of arrow 651. The LEDs may be of any color and in turn will cause each corresponding rod 622 to be illuminated with such color.

In an embodiment the rods are located along the outer diameter of the candle 602 and spaced side-by-side with corresponding LEDs similarly oriented so that vertical stripes of colors illuminate from the candle. Again, the color of light and frequency at which the light rays are transmitted can be controlled by the computer in order to greatly vary the illumination pattern.

FIG. 6 is a further embodiment disclosing the internal construction of a candle 702 according to the present invention. A candle tube 726 is provided having a vertical rod 710 mounted along an center axis of the candle 702. The rod 710 may have electrical wires therein or may have conductive traces thereon in order to power LEDs 750 mounted along the rod 710. The LEDs 750 may be any color such as red, green or blue. Mounted within the candle 702 oriented at the same location along the rod 710 as the LED 750 are cylindrical disks 722. The disks 722 in an embodiment are formed of clear or colored or translucent or transparent acrylic. The disks 722 have apertures 730 at the center having a diameter slightly larger than the width of the rod 710 and protruding LEDs 750, which can be mounted on both sides or around the entire perimeter of the rod 710. Both the internal and external edges of the disk 722 may be polished in order to aid in the transmission of light from the LEDs 750 for example, in direction of arrow 751. In this way the disks 722 act as waveguides in order to provide an illumination pattern of vertical rings along the length of the candle 702. The disks 722 may be spaced along the rod 710 or each disk 722 may be arranged side-by-side with correspondingly located LEDs along the rod 710. As discussed above, the color of light and frequency at which the light rays are transmitted can be controlled by the computer in order to greatly vary the illumination pattern.

Therefore, it may be understood that the reprogrammable candle of the present invention provides for illumination effects that may have many multiple arrangements which were not available on previous candles. The availability of so many multiple effects of the candles provides for many opportunities to use the gaming machine candle in many new ways. As opposed to merely signaling a servicing problem or merely a single bonus round; the programmable candle maybe used for many other circumstances and marketing purposes. The candle may communicate much information about the events occurring at that single gaming machine or a group of gaming machines. It is known that gaming machines may be connected through a local area network. The present invention may provide for the programming of the candle from a remote location via a local area network. In such a circumstance an entire group of gaming machines may be programmed in order to coordinate the flashing or illumination of their candles in order to display the certain information. For example, in a casino a group often gaming machines out of one hundred at certain times of the day have better odds than other machines or provide more bonus rounds. As well, the external visual indicator of the present invention may allow for the generation of more excitement at each gaming machine by flashing the candle or providing strobing effects, etc., which may indicate that a player has reached higher and higher levels within the machine and that higher and higher amounts of money are able to be won at that machine. Such strobing may cause other patrons of the casino to gather around that particular gaming machine. In addition, certain flashing lights may indicate that a member of a casino select group of patrons has begun to play that specific gaming machine. Therefore, it may be understood that the present invention may be used to promote the business and use of the gaming machine in addition to its more beneficial use to indicate what type of servicing might be required on each machine.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

The invention claimed is:

1. A gaming machine system, comprising:

a remote network having:

a display device to display a selection menu listing a plurality of illumination instructions and a plurality of triggering events;

an input device to receive input from a user to associate at least one of the plurality of illumination instructions with at least one of the plurality of triggering events; and a first processor to transmit an association signal having the at least one of the illumination instructions associated with at least one of the plurality of triggering events;

a plurality of gaming machine, each plurality of gaming machines having:

a second processor for controlling selected machine operations, the second processor configured to communicate with the remote network to receive and store the association signal;

an external visual indicator mounted on the gaming machine, the external visual indicator having a plurality of colored light emitting diodes (LEDs), the external visual indicator configured to:

communicate with the second processor; and display various colors in response to an illumination signal received from the second processor; and the second processor configured to detect a triggering event and transmit the illumination signal to the external visual indicator to trigger one or more of the plurality of colored LEDs in accordance with the illumination signal to provide a selected color illumination pattern in response to the triggering event, whereby triggering one or more of the plurality of colored LEDs provides a color change of the external visual indicator without requiring the use or removal or insertion of a colored plastic insert within the external visual indicator for changing the color that is displayed.

2. The system of claim 1, wherein the illumination pattern is multi-colored.

3. The system of claim 2, wherein the multi-colored illumination pattern is produced by a single LED.

4. The system of claim 1, further comprising:

a second triggering event associated with a second illumination pattern;

the second processor configured to:

detect the second triggering event; and upon occurrence of the second triggering event, transmit a second illumination signal to the external visual indicator to trigger the one or more of the plurality of colored LEDs to provide a second illumination pattern in response to the second triggering event.

5. The system of claim 1, wherein the second processor is configured to replace an existing illumination selection of the external visual indicator with the received illumination signal.

6. The system of claim 1, wherein the external visual indicator further comprises:

an input/output interface in communication with the second processor;

a coding buffer system coupled to the input/output interface;

a pulse width modulator coupled to the coding buffer system; and a current driver coupled to the pulse width modulator.

7. The system of claim 1, wherein the illumination signal is transmitted to the external visual indicator automatically upon occurrence of the triggering event.

8. The system of claim 1, wherein the plurality of colored LEDs include at least one of a red, yellow or green colored LED.

9. The system of claim 1, wherein the triggering event includes one of a jackpot, bonus round, currency needed or special player present situation.

10. A gaming machine, comprising:

means for receiving an association signal, the association signal associating at least one illumination instruction with at least one triggering event;

means for controlling selected gaming machine operations, wherein said at least one triggering event corresponds to one of the selected gaming machine operations;

means for storing the association signal;

an external visual indicator mounted on the gaming machine and having a plurality of colored light emitting diodes (LEDs);

means for detecting a first triggering event based upon one of the gaming machine operations; and means for illuminating the plurality of colored LEDs on the external visual indicator to provide a selected color illumination pattern based upon the associated illumination instruction, whereby triggering one or more of the plurality of colored LEDs provides a color change of the external visual indicator without requiring the use or removal or insertion of a colored plastic insert within the external visual indicator for changing the color that is displayed.

11. The gaming machine of claim 10, wherein the illumination pattern is multi-colored.

12. The gaming machine of claim 10, wherein the multi-colored illumination pattern is produced by a single LED.

13. The gaming machine of claim 10, further comprising means for detecting a second triggering event and upon occurrence of the second triggering event, means for triggering the LEDs to provide a second illumination pattern.

14. The gaming machine of claim 13, further comprising:

means for programming an operation sequence including the first and second triggering events; and means for triggering the operation sequence to display the first illumination pattern upon occurrence of the first triggering event and the second illumination pattern upon occurrence of the second triggering event.

15. The gaming machine of claim 10, wherein the means for illuminating further comprises means for transmitting an illumination signal to the external visual indicator and wherein the transmitting occurs automatically upon occurrence of the first triggering event.

16. The gaming machine of claim 10, further comprising:

means for controlling the gaming machine via a network or computer system that is configured to communicate with the gaming machine.

17. The gaming machine of claim 10, further comprising:

means for coordinating a processor with the gaming machine operations to sense the first triggering event;

means for signaling an I/O interface;

means for signaling a coding buffer system;

means for signaling a pulse width modulator; and means for controlling a current driver in order to control the LEDs according to a multi-colored illumination pattern.

* * * * *